US007885865B2

(12) United States Patent
Benson et al.

(10) Patent No.: US 7,885,865 B2
(45) Date of Patent: Feb. 8, 2011

(54) SYSTEM AND METHOD FOR MAPPING OF PLANOGRAMS

(75) Inventors: Wayne Mark Benson, Waynesville, OH (US); Joshua Alen Marsh, Lebanon, OH (US); Harold William Porginski, Jr., Columbus, OH (US)

(73) Assignee: The Kroger Co., Cincinnati, OH (US)

( * ) Notice: Subject to any disclaimer, the term of this patent is extended or adjusted under 35 U.S.C. 154(b) by 1433 days.

(21) Appl. No.: 10/843,204

(22) Filed: May 11, 2004

(65) Prior Publication Data

US 2005/0256726 A1 Nov. 17, 2005

(51) Int. Cl.
G06Q 10/00 (2006.01)
G06F 17/60 (2006.01)
(52) U.S. Cl. .......................................... 705/28; 705/10
(58) Field of Classification Search ........................ None
See application file for complete search history.

(56) References Cited

U.S. PATENT DOCUMENTS 6,341,269 B1 * 1/2002 Dulaney et al. ............... 705/22

| 6,442,530 | B1 * | 8/2002 | Miller .......................... 705/16 |
| 6,609,101 | B1   | 8/2003 | Landvater |
| 7,337,273 | B2 * | 2/2008 | Schmidt et al. ............. 711/129 |
| 2003/0004925 | A1 | 1/2003 | Knoblock et al. |
| 2003/0158796 | A1 * | 8/2003 | Balent ........................... 705/28 |
| 2003/0171979 | A1 * | 9/2003 | Jenkins .......................... 705/10 |
| 2005/0021561 | A1 * | 1/2005 | Noonan .................. 707/104.1 |

OTHER PUBLICATIONS

Nisa-Today's goes for planogram cool, Grocer. Crawley: Mar. 13, 2004. vol. 227, Iss. 7645; p. 13, 1 pgs.*
Applicant's description of a Planogram Mapping System which was in use prior to May 11, 2003, 1 page.

* cited by examiner

*Primary Examiner*—Matthew S Gart
*Assistant Examiner*—Garcia Ade
(74) *Attorney, Agent, or Firm*—Thompson Hine LLP

(57) ABSTRACT

A method for storing and organizing item arrangement information for an enterprise is provided. Standardized item arrangement maps are generated at the enterprise level and disseminated to stores within the enterprise. Managers create store maps consisting of compilations of the item arrangement maps provided by the enterprise. The resulting store maps define the arrangement of all items within the store. The store maps may be used in conjunction with an inventory system to order items and stock the store. Additionally, store maps may be used with a location information system to provide item location information to consumers.

6 Claims, 17 Drawing Sheets

New Planogram Maintenance pages:(First|Previous|Next|Last)    Displaying 1 thru 11 of 392

| Div | POG File | POG Description | Department | Commodity | Size |
|---|---|---|---|---|---|
| 016 | 0016 001 C035 V121 S032 C0 | TTL BTL WTR W/ 4 FILTERS COLUMBUS | 01-GROCERY | 035-WATER-CARBONATED/FLVRD DRINK KI | 32 |
| 016 | 0016 001 C035 V121 S036 C0 | TTL BTL WTR W/ 4 FILTERS COLUMBUS | 01-GROCERY | 035-WATER-CARBONATED/FLVRD DRINK KI | 36 |
| 016 | 0016 001 C035 V121 S040 C0 | TTL BTL WTR W/ 4 FILTERS COLUMBUS | 01-GROCERY | 035-WATER-CARBONATED/FLVRD DRINK KI | 40 |
| 016 | 0016 001 C039 V511 S001 C0 | CLUB PACKS WITH HORSD OEURVES-5 SHELF | 01-GROCERY | 039-FRZN MEAT/MEAT DINNERS | 1 |
| 016 | 0016 001 C039 V900 S011 C0 | FZ ENTREES-PREMIUM/NUTRITIONAL 6/7 SHELF | 01-GROCERY | 039-FRZN MEAT/MEAT DINNERS | 11 |
| 016 | 0016 001 C039 V900 S012 C0 | FZ ENTREES-PREMIUM/NUTRITIONAL 6/7 SHELF | 01-GROCERY | 039-FRZN MEAT/MEAT DINNERS | 12 |
| 016 | 0016 001 C039 V900 S013 C0 | FZ ENTREES-PREMIUM/NUTRITIONAL 6/7 SHELF | 01-GROCERY | 039-FRZN MEAT/MEAT DINNERS | 13 |
| 016 | 0016 001 C039 V900 S014 C0 | FZ ENTREES-PREMIUM/NUTRITIONAL 6/7 SHELF | 01-GROCERY | 039-FRZN MEAT/MEAT DINNERS | 14 |
| 016 | 0016 001 C039 V900 S015 C0 | FZ ENTREES-PREMIUM/NUTRITIONAL 6/7 SHELF | 01-GROCERY | 039-FRZN MEAT/MEAT DINNERS | 15 |
| 016 | 0016 001 C039 V900 S016 C0 | FZ ENTREES-PREMIUM/NUTRITIONAL 6/7 SHELF | 01-GROCERY | 039-FRZN MEAT/MEAT DINNERS | 16 |
| 016 | 0016 001 C039 V900 S017 C0 | FZ ENTREES-PREMIUM/NUTRITIONAL 6/7 SHELF | 01-GROCERY | 039-FRZN MEAT/MEAT DINNERS | 17 | pages:(First|Previous|Next|Last)    Displaying 1 thru 11 of 392

*Fig. 11*

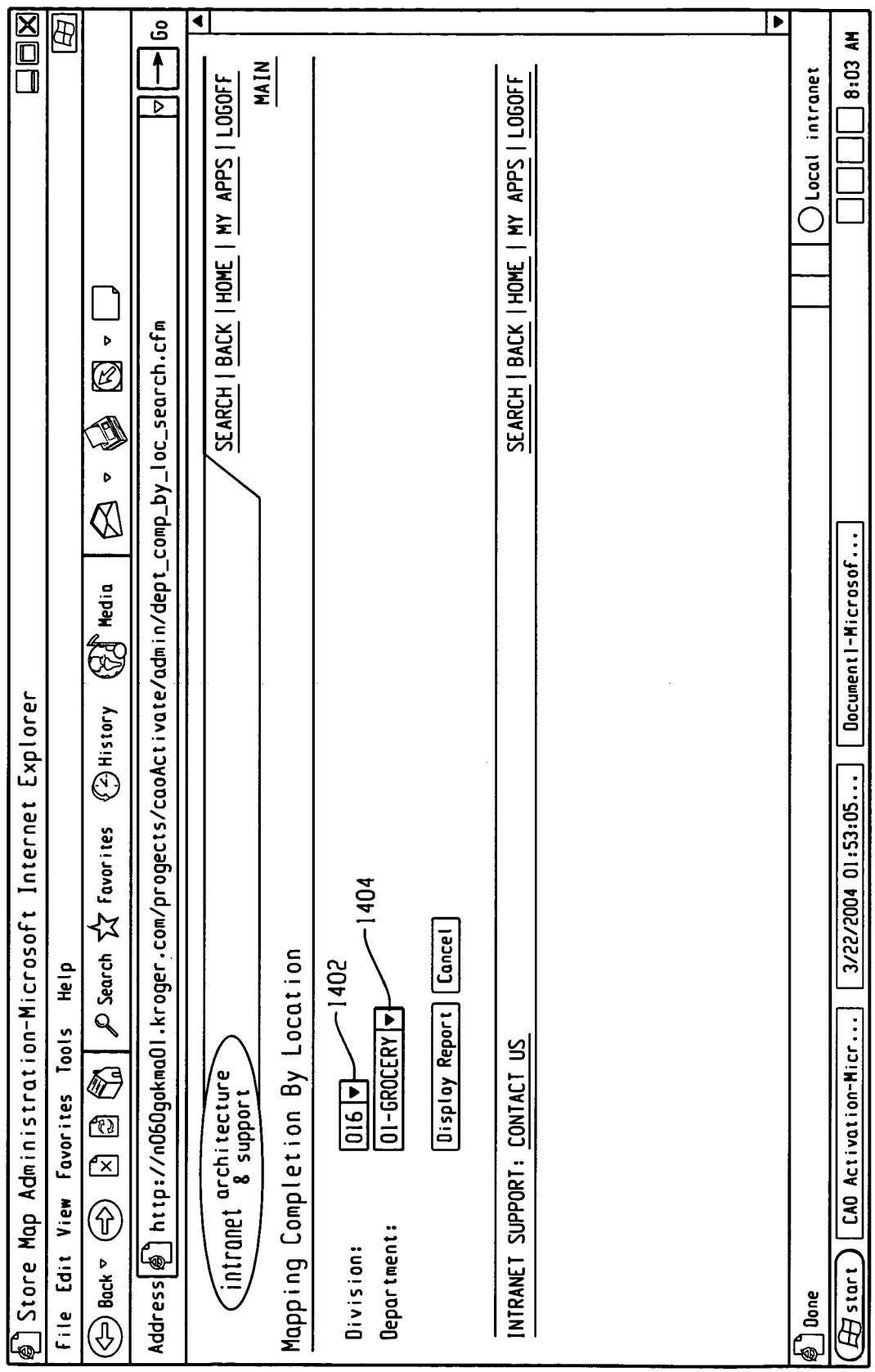

Mapping Completion By Location

Division 016/Department 01-GROCERY

| Location | Re-Map | No-Applicable | Completed | Total | Percentage | Detail |
|---|---|---|---|---|---|---|
| 001-2433 E. DUBLIN GRANVILLE | 0 | 0 | 0 | 78 | 0% | VIEW |
| 002-342 PERRY ST. | 1 | 8 | 68 | 79 | 96% | VIEW |
| 003-1241 WARWOOD AVE. | 1 | 16 | 50 | 79 | 84% | VIEW |
| 004-3558 MAIN ST. | | 0 | 0 | 79 | 0% | VIEW |
| 005-6962 EAST MAIN ST. | 2 | 0 | 67 | 79 | 85% | VIEW |
| 006-2913 OLENTANGY RIVER | 1 | 10 | 66 | 79 | 96% | VIEW |
| 007-240 W. MAIN ST. | 2 | 0 | 0 | 79 | 0% | VIEW |
| 008-2 EAST A STREET | 1 | 66 | 10 | 79 | 96% | VIEW |
| 009-91-27th ST. | | 32 | 44 | 79 | 96% | VIEW |
| 010-159 S. SANDUSKY | 1 | 4 | 72 | 79 | 95% | VIEW |
| 011-560 E WORTHINGTON MALL | 2 | 2 | 73 | 79 | 95% | VIEW |
| 012-560 E LIVINGSTON AVE. | | 2 | 73 | 79 | 95% | VIEW |
| 013-211 N. MARSHALL ST. | 2 | 1 | 74 | 79 | 95% | VIEW |
| 014-83 HAMILTON | 1 | 2 | 73 | 79 | 95% | VIEW |
| 015-4485 REFUGEE RD. | 1 | 0 | 76 | 79 | 96% | VIEW |

*Fig. 14B*

SYSTEM AND METHOD FOR MAPPING OF PLANOGRAMS

FIELD OF INVENTION

The present invention relates to a system and method for arranging collections of items using management maps to define the configuration of individual retail outlets across an entire enterprise. The system and method may be used to identify the location of items within a retail outlet or to assist in ordering and stocking the retail outlet with items.

BACKGROUND OF THE INVENTION

Large merchandising enterprises such as regional, national or global retailers and suppliers of various goods are better able to leverage the advantages provided by their size when they are able to promote uniformity and consistency at the individual retail outlet level. In general, a retail outlet or store as used herein is a physical location where transactions occur between the customer and the enterprise. Stores may be subdivided into smaller sections or departments to more effectively control and track their revenues and expenses. Examples of departments for a typical large store or what is typically called a superstore may include a men's clothing department, women's clothing department, toy department, consumer electronics department, grocery department, meat department, pharmacy department, furniture department and the like. Examples of departments within a typical grocery store can include the meat department, pharmacy department, grocery department and the like.

An enterprise can be a number or collection of stores that may be grouped by geographical or corporate characteristics, such as divisions. A division can be a subset of stores within an enterprise. Divisions may be defined by geographical location, type of store, e.g. a convenience store or a superstore, or demographics, e.g. rural, urban or suburban. Individual stores may vary in size, geographic region and consumer demographics; however, groups of stores or departments may appear virtually identical. It is difficult to promote uniformity when dealing with a large diverse enterprise. One method of promoting uniformity is to identify areas of commonality and to promote consistency within those areas. In particular, one area in which significant benefits may be obtained through consistency is the uniform arrangement of items on store shelves and uniformity in how these items are stocked within the stores.

Inconsistent item management can waste time and money. For example, it takes a significant amount of time simply to gather the relevant item and stocking information during store inventories. Generally large groups of employees are gathered specifically for the purpose of conducting an inventory and these inventories are ordinarily during non-typical work hours. Additionally, in the context of a retail store, a planogram may contain information or a graphical depiction of the items and how they are arranged on a particular or discrete store shelf. It is extremely inefficient for each store manager of each individual store within a large enterprise to create and manage planograms for each section of their own stores. This would require managers of new stores to spend vast amounts of time mapping out the arrangement of items for their new store. Additionally, numerous changes often occur regarding the particular items being handled by the large retail enterprise. For example, new items are continually introduced and existing items continually change their packaging size, shape and marketing, often with each seasonal change. Large amounts of time can be wasted when each store manager in the enterprise must update their own individual planograms to reflect such changes and often the desired uniformity between stores is lost.

A lack of uniformity between stores within the same enterprise can be irritating to some customers. Most customers prefer consistency when dealing with large retail enterprises. Customers find it easier to locate items in stores that use uniform shelf stocking plans throughout the enterprise because they become more familiar with the layouts and patterns of the stores. For example, a customer of a particular neighborhood grocery store may become familiar with the location of their favorite items. When that customer utilizes another grocery store within the same enterprise they expect similarities in locations of items whether the store is across town or across the country. This is especially true when stores have the same name. By the same token if customers are forced to learn new layouts or patterns in each store within an enterprise, they may become irritated or confused.

There exists a need for a system and method of maintaining a set of planograms at an enterprise wide level to promote uniformity and efficiency amongst all the stores within the enterprise. Once preferred, effective planograms are developed by the enterprise, there is a need for an efficient manner of making these planograms accessible to each store manager throughout the enterprise. There is a further need for a method of organizing a set of planograms designed for different store types and sizes, for example, large superstores versus smaller grocery stores. A large superstore may include departments such as a toy department or floral department that may not be included in a smaller grocery store. Such a method should provide store level, division level or enterprise level managers with the discretion to select the most appropriate planograms available for the individual store based upon numerous characteristics such as size, type, consumer demographics and geographical location.

Even when a set of individual or discrete planograms are selected there is a need for a method of organizing and compiling the selected planograms to define an entire collection of planograms organized within a specified space such as is depicted within a store. Store managers need the ability to select and combine existing planograms to create a map describing shelf management for the entire store. Division or enterprise level managers need a method for monitoring store compliance with the preferred planograms. What is needed is a centrally managed system and method for handling store planograms that would provide such invaluable operational, financial and marketing information for everyone in the enterprise.

BRIEF SUMMARY OF THE INVENTION

A method is provided for arranging a collection of electronic files, illustrative of arrangements of items in discrete spaces. The method comprises providing a plurality of the electronic files containing arrangement information for a plurality of items. The plurality of electronic files is stored in a storage medium. A collection file for storage of identification information from at least one of the plurality of electronic files is created. The identification information from at least one of the plurality of electronic files in the storage medium is obtained and stored in the collection file.

An alternative embodiment of the method utilizes the collection of electronic files in conjunction with an inventory system. The method further comprises determining an actual number of units available for each of the plurality of items and comparing the actual number of units to a minimum number of units for each of said plurality of items. An alert is triggered when the actual number of units is less than the minimum number of units for at least one of the plurality of items. In a further embodiment, a stock order is generated when the actual number of units is less than the minimum number of units for at least one of the plurality of items.

In yet another alternative embodiment, the method further comprises displaying a representation of the identification information. The identification information for at least one of the electronic files is selected. The arrangement information contained in the electronic file identified by the selected identification information is obtained and displayed.

BRIEF DESCRIPTION OF THE SEVERAL VIEWS OF THE DRAWING

While the specification concludes with claims particularly pointing out and distinctly claiming the present invention, it is believed that the present invention will be better understood from the following description in conjunction with the accompanying drawing figures, in which like reference numerals identify like elements, and wherein:

FIG. 11 is an illustration of a display screen of the planogram administration application depicting new planograms in accordance with the present invention;

FIG. 14A is an illustration of a display screen of the planogram administration application depicting a search screen for generating a mapping completion report in accordance with the present invention; and FIG. 14B is an illustration of a display screen of the planogram administration application depicting a mapping completion report in accordance with the present invention.

DETAILED DESCRIPTION OF THE INVENTION

The present invention is a system and method for arranging collections of items using item management maps to define the configuration of aisles or stores across a retail or wholesale enterprise. Items or products, as used herein, are merchandise to be sold by the enterprise. An enterprise, as used herein, is a business organization. A retail enterprise is a business organization that sells to the ultimate consumers, and a wholesale enterprise is a business organization that sells items for resale (usually to retail enterprises). Examples of retail enterprises include, but are not limited to, superstores, outlet stores, department stores, pharmacies, hardware stores, novelty stores, home improvement centers, auto supply centers, and discount stores. Examples of wholesale enterprises include, but are not limited to, retail suppliers, independent distributors, and wholesalers. For the purposes of describing a preferred embodiment of the present invention, this description will discuss a large retail grocery enterprise. This preferred embodiment is merely exemplary in nature and is in no way intended to limit the invention, its application, or uses and alternatively this invention can be used in most any retail or wholesale enterprise.

Figure 1:
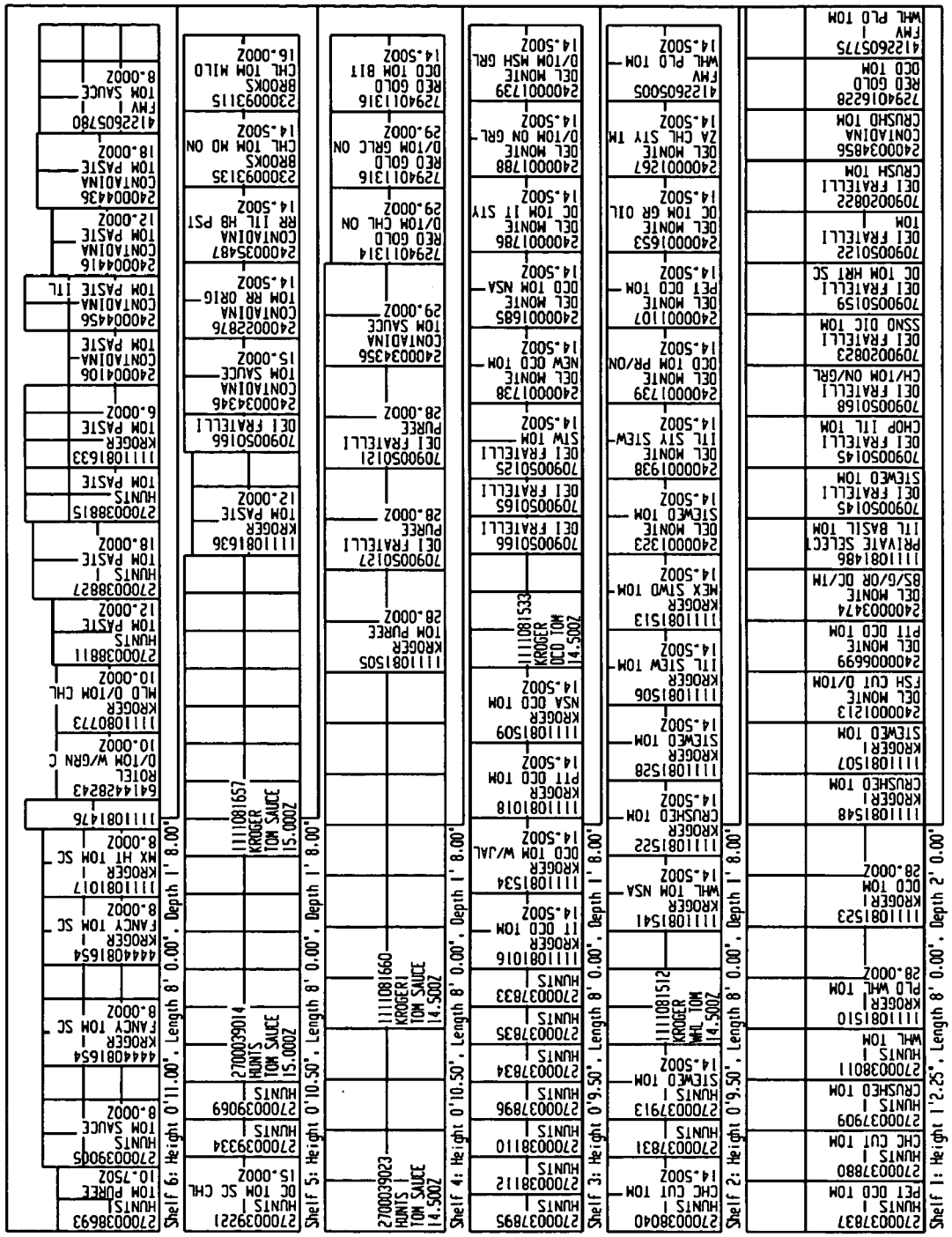
FIG. 1 is an illustration of a planogram.

Referring now to FIG. 1, a preferred embodiment of the present invention provides a method for organizing and combining shelf management maps, or planograms. Typical planograms contain item arrangement data, generally describing the items and how they are arranged on a particular or discrete store shelf. Planograms can be created using shelf management software tools, such as the Apollo 8.0 shelf management tool commercially available from Information Resources, Inc. of Chicago, Ill. These planograms can contain a graphical depiction of a section of a store. A section, as used herein, is an area within a store, such as a shelf, a set of shelves, an aisle, aisles or a portion of an aisle. Sections may be of different sizes, for example, a section can have typical lengths of four, eight or twelve feet. Shelves may vary by number, width, depth and height. In addition to, or instead of a graphical depiction of the store section, a planogram may contain a textual description of the items contained within the section. In particular, the exemplary planogram shown here depicts an eight-foot section of an aisle in a grocery store. The section has six shelves containing various tomato products. The planogram contains information regarding the height of each shelf, the name and type of items to be displayed on each shelf, and the order in which the items are to be arranged and may include the exact placement of the item on the shelf. A preferred embodiment of a planogram may include information indicating the minimum quantity of units of each item that should be present at the store at any given time. Alternatively, numerous other shelf management tools or formats known in the art for arranging items can be utilized to create individual planograms.

A preferred embodiment of the present invention describes a method for utilizing planograms to create a store map. A store map, as used herein, is a compilation of planograms completely describing the items present or expected to be present in the store. Each individual planogram defines the arrangement of items within a section of a store. A set of planograms can be combined to define the arrangement of items in an aisle, a department or an entire store. For example, the planogram depicting a section of tomato products may be adjacent to a planogram for a section of pasta products. The planogram for pasta products may be adjacent to a planogram for a section of salad dressings. An entire store may be described by compiling various disparate planograms and information indicating the physical location of each planogram within the store. A store map can define an entire a store by compiling planograms and planogram location information. In a preferred embodiment, a store map does not contain the actual planograms themselves but instead, the store map preferably contains information sufficient to identify the individual planograms utilized in the particular store.

Once a store map is created, it may be used in conjunction with an inventory system to generate automatic stock replenishment orders. Inventory systems are typically software systems used to track the actual stock levels of items in the store. A stock level, as used herein is the number of units of the item in the store. This would include any items located on shelves or in any storage area, such as a back room, staging area or stock room of the store. The inventory system records numbers of items as they are received from suppliers, sold to consumers, or recorded as a loss due to shrinkage. Shrinkage may be caused by spoiling of perishable items, theft or damage to items. The store map provides the inventory system with information on each item to be stocked in the store and an initial minimum recommended stock level for the item. By comparing the actual stock level of an item to the minimum recommended stock level of the item, the inventory system may generate a list of items that need to be replenished. In a preferred embodiment, the inventory system will automatically generate and transmit a replenishment order to the warehouse.

The store map may also be used in conjunction with an inventory system to ensure that an adequate stock of new items is on hand for a store section reset. As used herein, during a store section reset, all items are removed from a section of the store, the shelves in the section may be reconfigured and the items are returned to the section in a new arrangement. Such store section resets may occur on a regular basis for large retail enterprises. Store section resets may even occur at the request of suppliers to promote new or modified items. In fact, store section resets are frequently handled by third parties hired by the suppliers for this purpose. Before a store section reset occurs, a new planogram describing the arrangement of items can be generated. The information contained in the new planogram may be used to ensure that the items necessary for the store section reset are available at the store at the time of the store section reset. Preferably, the new planogram is available and information from the new planogram is automatically imported into the inventory system, so that the necessary items can be automatically ordered in advance of the store section reset. Preferably this order occurs about a week prior to the store section reset to assure the items are on hand when needed.

Figure 2:
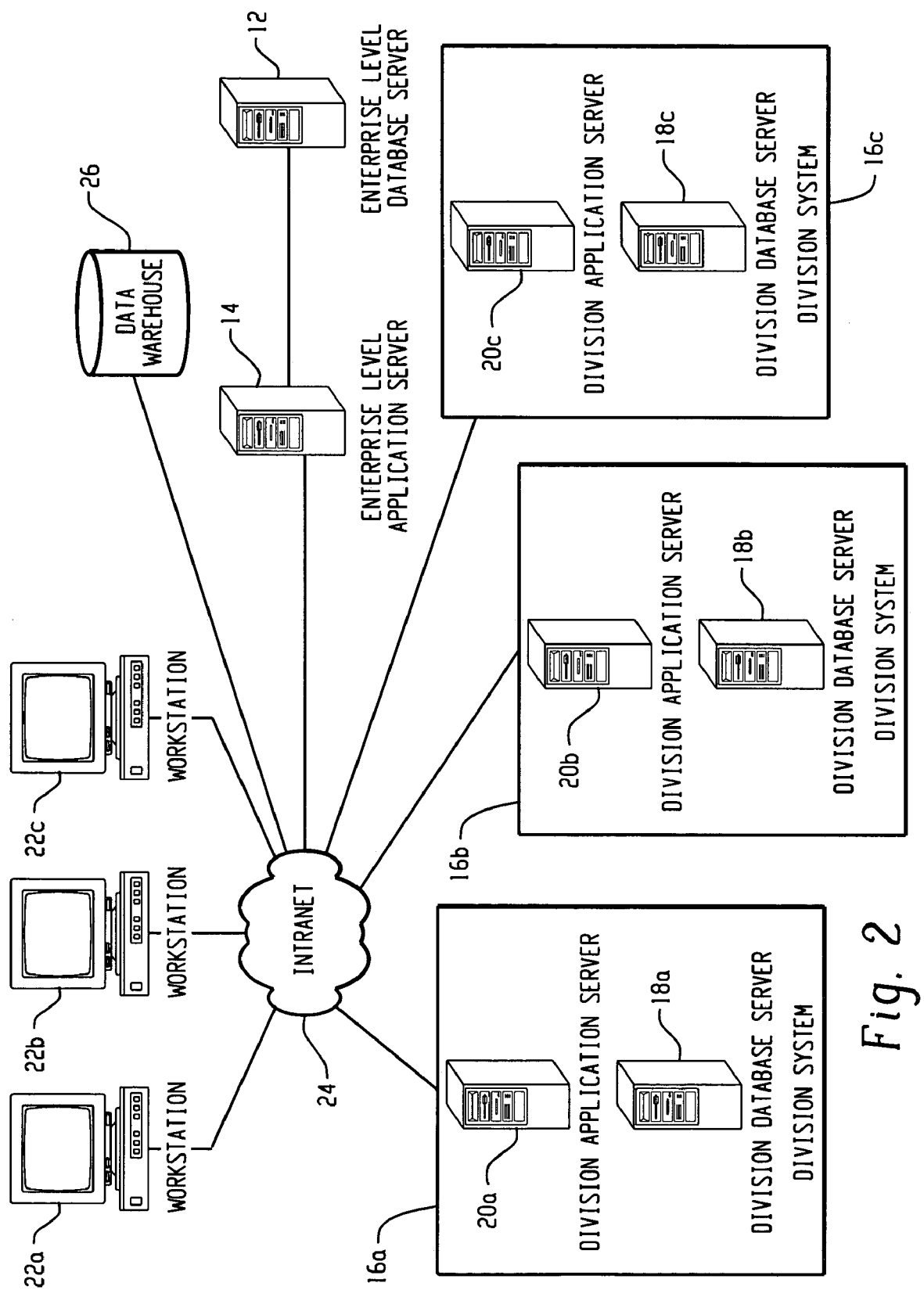
FIG. 2 is a block diagram of the basic architecture of the present invention.

FIG. 2 illustrates one embodiment of a system architecture for the present invention. Planograms generated using a shelf management tool are saved on an enterprise level database server 12. In a preferred embodiment, the enterprise level database server uses the Advanced Interactive eXecutive (AIX) operating system, commercially available from International Business Machine Corporation (IBM) of Armonk, N.Y. An enterprise level application server 14 may be connected to the enterprise level database server 12 through a local area network (LAN) or a wide area network (WAN). In the preferred embodiment the enterprise level application server 14 is utilizing WebSphere Application Server software commercially available from IBM. The enterprise level application server 14 is connected to a WAN, such as an intranet 24, the Internet, an extranet or some other network. The enterprise level application server contains a collection of planogram information files in Portable Document Format (PDF) by Adobe Systems Incorporated of San Jose, Calif. There is a division system 16a, 16b or 16c for each division within the enterprise. Each division system 16a, 16b or 16c includes a division database server 18a, 18b or 18c and a division application server 20a, 20b or 20c. The store maps for all stores within a division are located in the division database server 18a, 18b or 18c for that division. Workstations 22a, 22b and 22c are connected to the enterprise level application server 14 and the division systems 16a, 16b and 16c via the intranet 24. The enterprise level application server 14 and the division systems 16a, 16b and 16c are connected through a WAN, such as an intranet 24. The workstations 22a, 22b and 22c may be implemented using personal computers having suitable input/output devices, such as a mouse or keyboard, processors, memory and communications interfaces. For example, the workstations 22a, 22b and 22c could be implemented using the ThinkCentre™ A30, commercially available from IBM. Workstations, as used herein, may also include digital assistants and other devices permitting connection to and navigation of the network. Periodically, data is saved in the data warehouse 26. As used herein, a data warehouse 26 is a database designed to support enterprise level decisions. The system is sufficiently flexible in its design to permit implementation in various computer systems and networks and is not limited to the system architecture described above.

A preferred embodiment of the invention utilizes a relational database, such as DB2 Universal Database V8.1 commercially available from IBM, to save planograms on the enterprise level database server 12. The SQL Server® relational database, commercially available from Microsoft Corporation of Redmond, Wash. is used to implement the division databases. The division databases are used to save planogram information and store maps on the division database servers 18a, 18b and 18c. Planograms contained in the enterprise level database server are generated using a shelf management tool. The enterprise level database of planograms is accessible only through the enterprise level application server 14. In a preferred embodiment, the collection of planograms contained in the enterprise level database includes every planogram in use throughout the enterprise. Consequently, the enterprise level database contains numerous planograms for all types of stores, store sizes and configurations. Access to the enterprise level database to create or modify planograms is restricted to authorized personnel. Store managers are required to utilize only planograms contained within the database.

A software program located on the enterprise level application server 14 translates planograms from the file format created by the shelf management tool to file formats that may be more easily utilized by other applications. Each planogram file is translated to create a PDF file version of the planogram and a text file version of the planogram. A text file is a file containing only text characters. Text files are transmitted to the appropriate division database server 18a, 18b or 18c. A periodic batch job updates the PDF and text files whenever a planogram is created or modified. As used herein, a batch job is simply a process for performing an operation automatically on a group of files rather than requiring a user to manually open and close each file to perform the operation.

Figure 3:
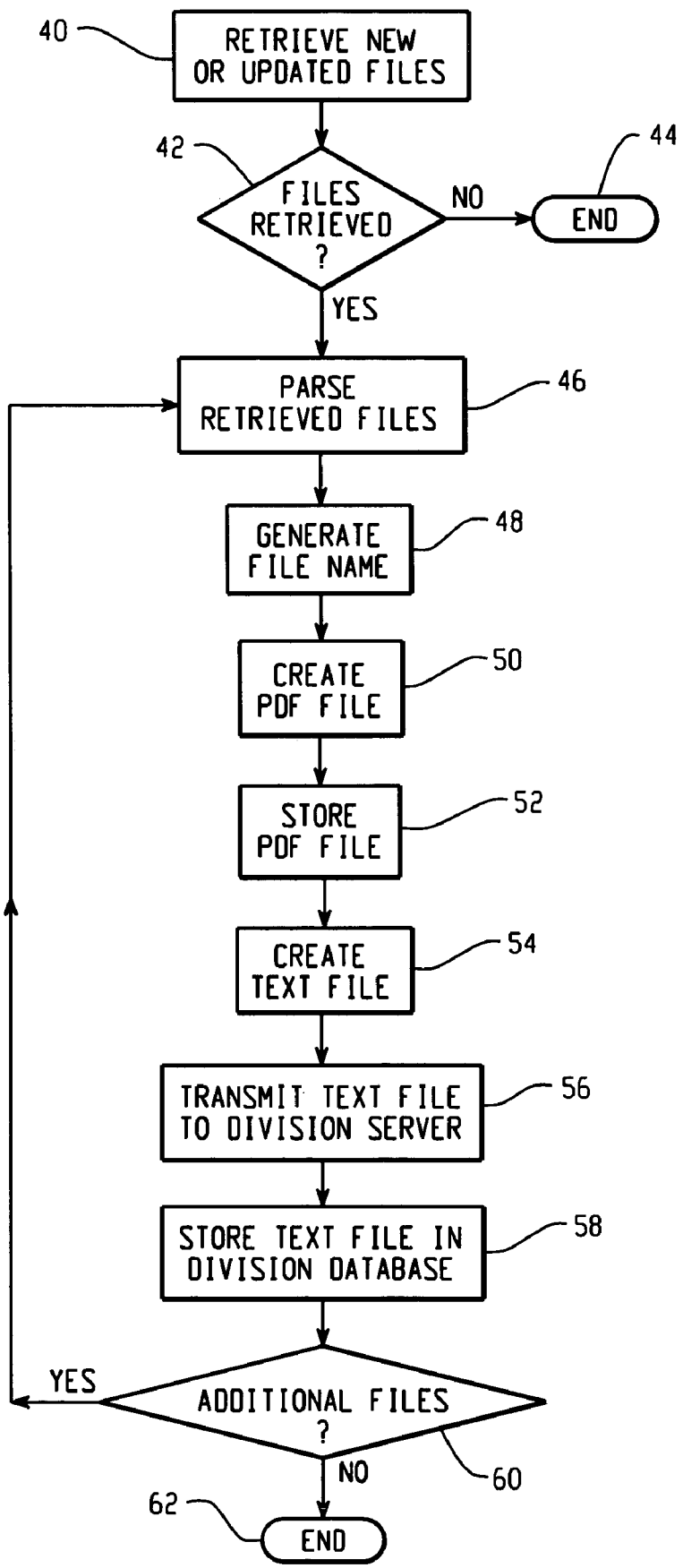
FIG. 3 is a flowchart illustrating the batch process for updating files.

Referring now to FIG. 3, the batch job will process each planogram created or modified since the last operation of the batch job. At step 40, the batch job will retrieve any new or modified planogram files. Preferably, the batch job is run each night. At step 42, if no new or updated planogram files are retrieved the batch job will terminate at step 44.

At step 46, the batch job will parse the planogram file generated by the shelf management tool. Preferably, the batch job is a Perl script. Perl (Practical Extraction Report Language) is a programming language specifically designed for processing text. The batch job will generate a file name for the PDF file and text file which may be based upon the appropriate division, department, commodity, version number, section size, cluster number or some other characteristic of the planogram at step 48. As used herein, a commodity is simply a reference to a category of items. For example, tomato products is a commodity in the grocery department including, for example, tomato paste, stewed tomatoes and tomato sauce. Section size indicates the size of the length of the section mapped by the planogram, e.g. four feet or eight feet. Version numbers are used to distinguish two or more alternative planograms for the same division, department, commodity and section size. The cluster number is used to distinguish specific marketing areas within a division of the enterprise. Files may be easily recognized when a standard naming convention is utilized. Preferably, the file name is be created by concatenating the appropriate division code, department code, commodity code, version number, section size, and cluster number. The division code may be converted into a string of four characters beginning with the letter "D." The department code may be converted into a string of three characters each beginning with the letter "D." The commodity code may be converted to a string of four characters starting with the letter "C." The version number may be converted into string of four characters starting with the letter "V." The section size in feet may be converted into a string of four characters beginning with the letter "S." The cluster number may be converted into a string of two characters starting with the letter "C." The following tables provide a few illustrative examples of division codes, department codes and commodity codes in accordance with the present invention:

| Division Name | Division Code |
| --- | --- |
| Central Ohio | 001 |
| NorthEastern Ohio | 002 |
| South Western Ohio | 003 |

| Department Name | Department Code |
| --- | --- |
| Grocery | 01 |
| Pharmacy | 02 |
| Meat | 03 |

| Commodity Name | Commodity Code |
| --- | --- |
| Tomato Products | 001 |
| Canned Fruits | 002 |
| Pasta Products | 003 |

| Cluster Name | Cluster Code |
| --- | --- |
| Columbus | 0 |
| Mansfield | 1 |

Zeroes can be added to the beginning of the numbers as needed to create strings of characters of the correct length. An exemplary file name for an eight-foot section of tomato products at a Columbus, Ohio store could be created by concatenating the information as follows:

Division (D001)+Department (D01)+Commodity (C001)+Version number (V003)+Section Size (S008)+ Cluster Number (C0)

This would result in the following file name "D001_D01_C001_V003_S008_C0." The same file name may be used for both the PDF file and text file, e.g. "D001_D01_C001_V003_S008_C0.pdf" and "D001_D01_C001_V003_S008_C0.txt", since file extensions, e.g. ".pdf" and ".txt", indicate the file format type and will prevent any possible confusion. The naming convention utilized in this preferred embodiment allows files to be easily identified and retrieved based upon division, department or commodity.

At step 50, the batch job will utilize the information parsed from the shelf management tool planogram file to create a PDF file containing a graphical depiction and text description of a store section. The PDF file is saved to the enterprise level application server 14 at step 52. Next, the batch process uses the same parsed information to create a text file at step 54. The text file contains only text characters in a format that may be easily parsed and analyzed by other software applications. At step 56 the batch process transmits the text file to the appropriate division database server 18a, 18b or 18c based upon the planogram division. At step 58 a Perl script located on the division database server 18a, 18b or 18c will parse the text file and save the information in the division database.

In one embodiment, the planogram information can be saved in the division database so as to prevent duplication of information. Planogram information, as used herein, refers to the underlying item arrangement information, whether that information is saved in the format created by the shelf management tool, PDF, text file format or the like. Each planogram contains detailed information regarding the items with in a section of a store. In a large enterprise there will be multiple planograms describing the same store sections. For example, there may be a planogram describing an eight-foot section of dog good and a planogram describing a twelve-foot section of dog food. These planograms are likely to contain many of the same items. Preferably, the planogram information is saved in the database as a system of files called tables designed to reduce the duplication of information.

The division database contains multiple types of tables used to contain planogram information. In this preferred embodiment, planogram information is contained in three different tables: the planogram header table, the planogram detail table and the item detail table. The planogram header table can contain an entry for each planogram. Preferably, the entry includes a unique planogram identification code (POG), a division code, a department code, a commodity code, a textual description of the planogram, and the universal product code (UPC) of every item within the planogram. The POG contains identification information for a planogram and may be the same as the file name of the PDF file and text file generated for the planogram. The planogram detail table may contain an entry for each item in a planogram and can include the shelf number and position of the item. The item detail table may contain an entry for each item sold by the enterprise and can include the UPC, a textual description of the item, the item size and case size. Case size, as used herein, refers to the number of units of the item in a case. Items are frequently shipped and stocked by the case, rather than by individual units. Information may be retrieved from the database tables using a key. Keys are units of data used to sort and retrieve data from the tables. For example, the UPC may be used as the key for the item detail table. A database search using the UPC code may retrieve the detailed item information for that item, a textual description of the item, the item size and the case size. The key for the planogram detail table can be the POG plus the UPC. A database search using the POG and the UPC would retrieve the shelf and shelf position of the item. Finally, the POG may be used as the key for the planogram header table.

By starting with the POG of a planogram the system can retrieve all of the information contained in the planogram from the database tables. A search of the database header table using the POG may retrieve the division, the department, the commodity, and the UPCs for all items contained in that planogram. Repeated searches of the planogram detail table using the POG and the item UPCs may retrieve information indicating the shelf and position of each of the items. Additionally, the UPCs may be used to search the item detail table and retrieve a textual description of the item, the item size and the case size of each item in the planogram.

After the planogram information is stored in the division databases, the batch job determines if there are additional planograms to process from the enterprise level database at step 60. If there are additional planograms, the batch job returns to step 46. If there are no more new or updated planograms to process, the batch job terminates at step 62.

Figure 4:
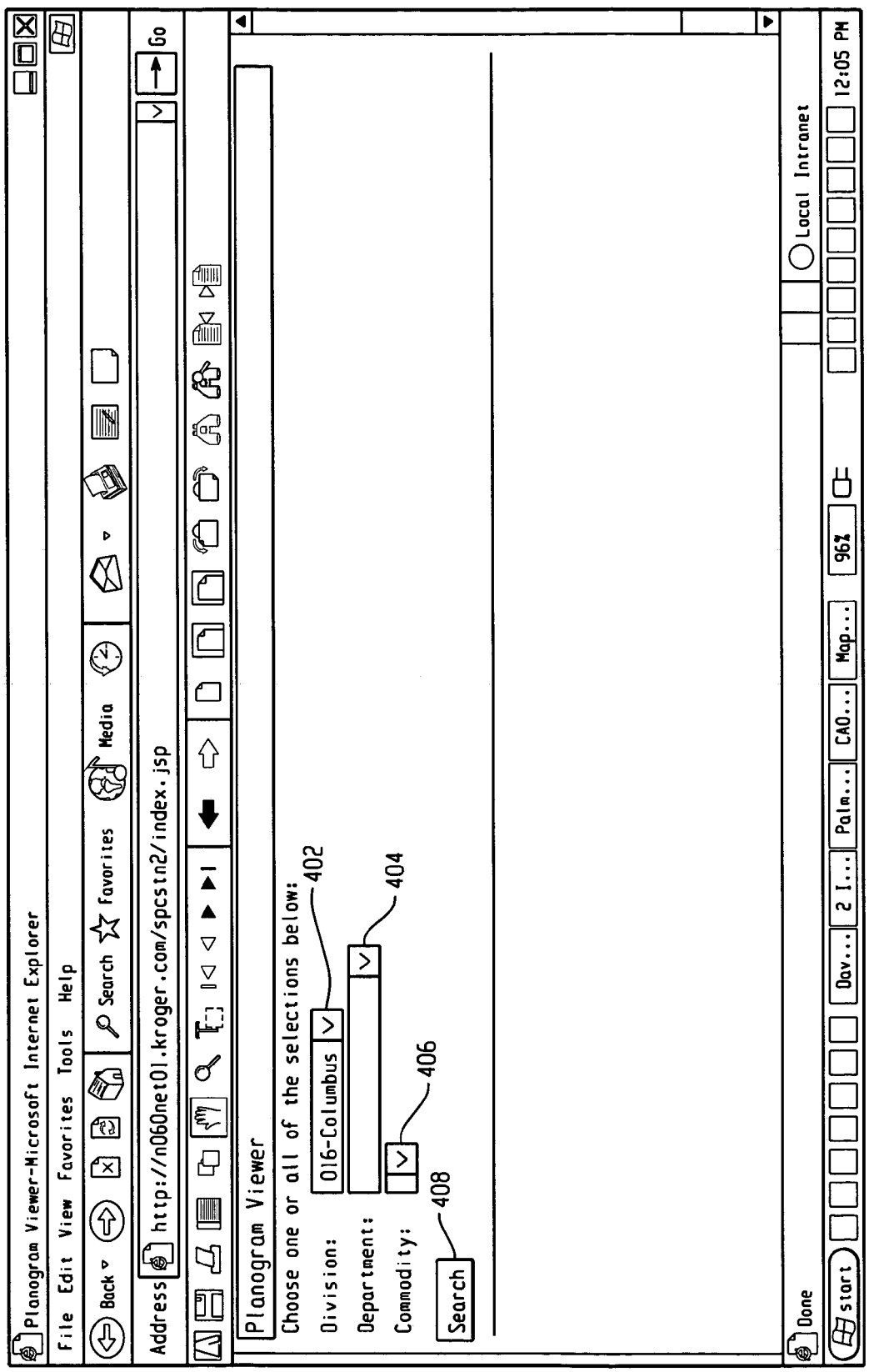
FIG. 4 is an illustration of the initial display screen of the planogram viewer application in accordance with the present invention.

Referring now to FIG. 4, a preferred embodiment of the present invention may include an application for viewing the planograms. Illustrated here is the initial display screen of the planogram viewer. The planogram viewer software application allows users to view, print and download PDF files containing planogram information. The planogram viewer is a graphical user interface (GUI) on the enterprise level application server 14. Users may access the planogram viewer from any workstation 22a, 22b or 22c connected to the intranet 24. Users may elect to search the existing planograms using search terms selected from the provided menus. A menu is a button on the display screen, which when selected displays a list of options from which a user can choose. The application will search the directory containing the PDF files based upon the user selections from the menus. The user may select terms from the menus by use of numerous methods. For example, a user may use a keyboard, mouse, joystick, track ball, touch screen or the like to select a term.

In this preferred embodiment, the user may retrieve PDF files based upon division, department or commodity. Using a division search term selected from the division menu 402, users may choose to search for planograms of specific division. Users may select a department search term from the department menu 404 in conjunction with a specific division search term to retrieve for department planograms from a particular division. Alternatively, a department search term may be used without specifying a division to locate all planograms for a department in any division. The commodity menu 406 allows the user to search the PDF files by commodity and is available only after the user has selected a department. Options available on the commodity menu 406 will vary depending upon the selected department. For example, if the grocery department option is selected, commodity menu options will include items such as canned fruit, pasta products, soups, tomato products and the like. While a preferred embodiment allows the user to search the PDF files by division, department and commodity, many other search terms are feasible. One skilled in the art will appreciate that different search methodologies may be utilized, such as allowing the user to search for key words within the files.

Once the desired search terms are selected, the user may start the search by selecting the search button 408. The planogram viewer searches the directory containing the PDF files on the enterprise level application server 14 based upon the user selected search terms. The PDF file names follow the naming convention described above and indicate division, department and commodity. The planogram viewer parses the file names to identify those files that meet the search criteria. The planogram viewer will use the information contained in the file name to display information regarding the planograms that satisfy the search criteria.

Figure 5:
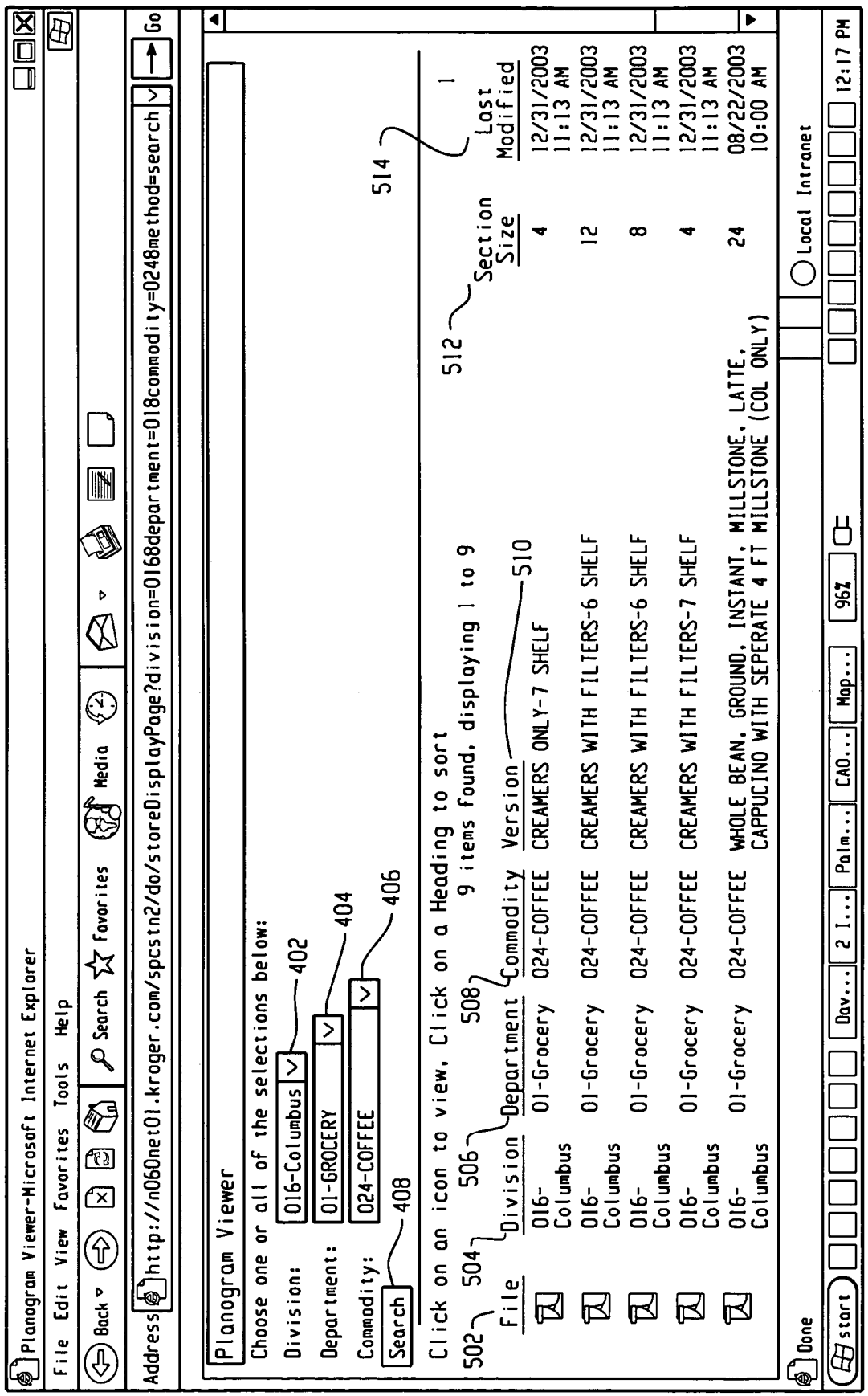
FIG. 5 is an illustration of a display screen of the planogram viewer application displaying search results in accordance with the present invention.
Figure 6A:
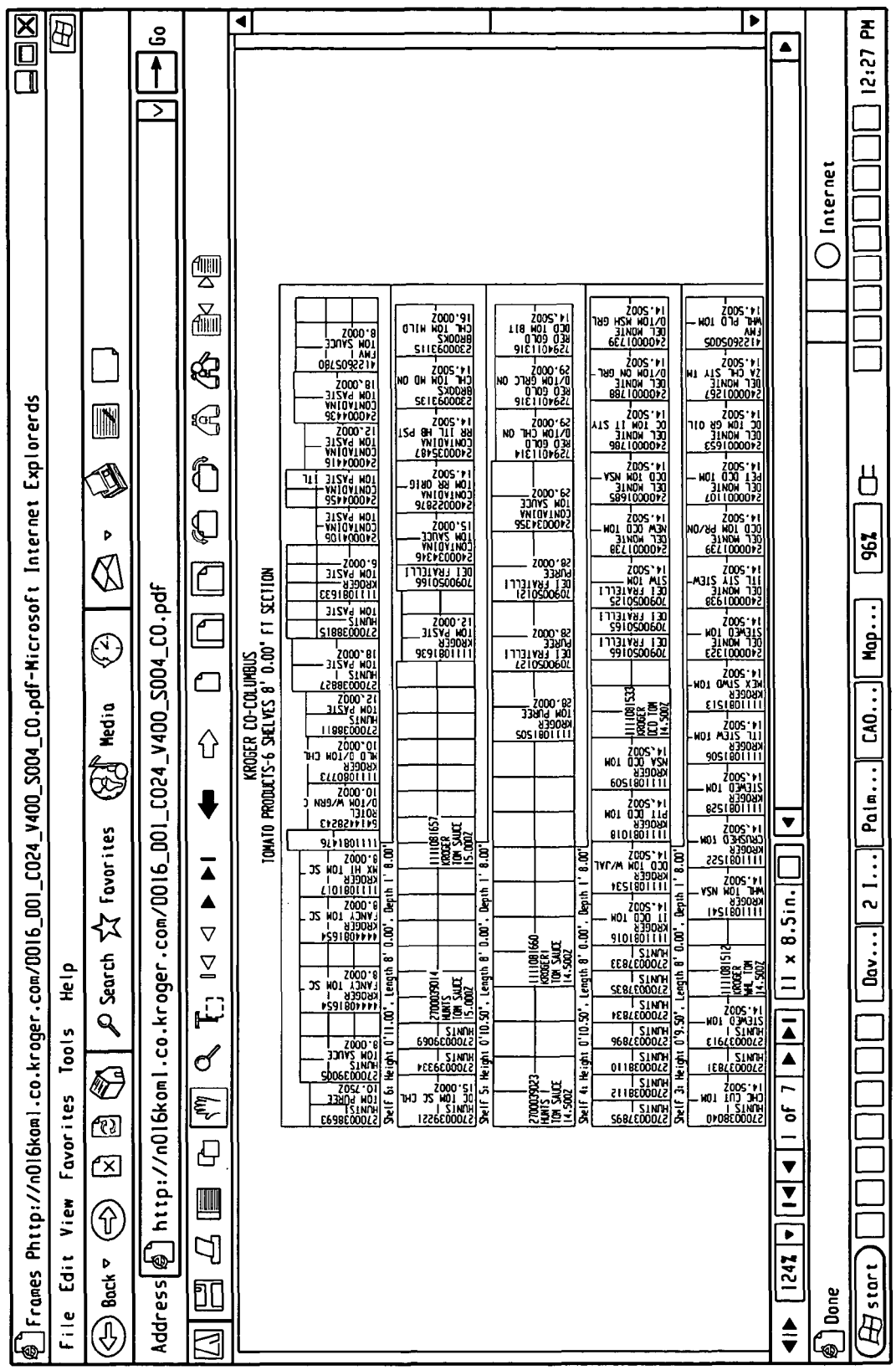
FIG. 6A is an illustration of a display screen of the planogram viewer application depicting a graphical depiction user-selected planogram in accordance with the present invention.
Figure 6B:
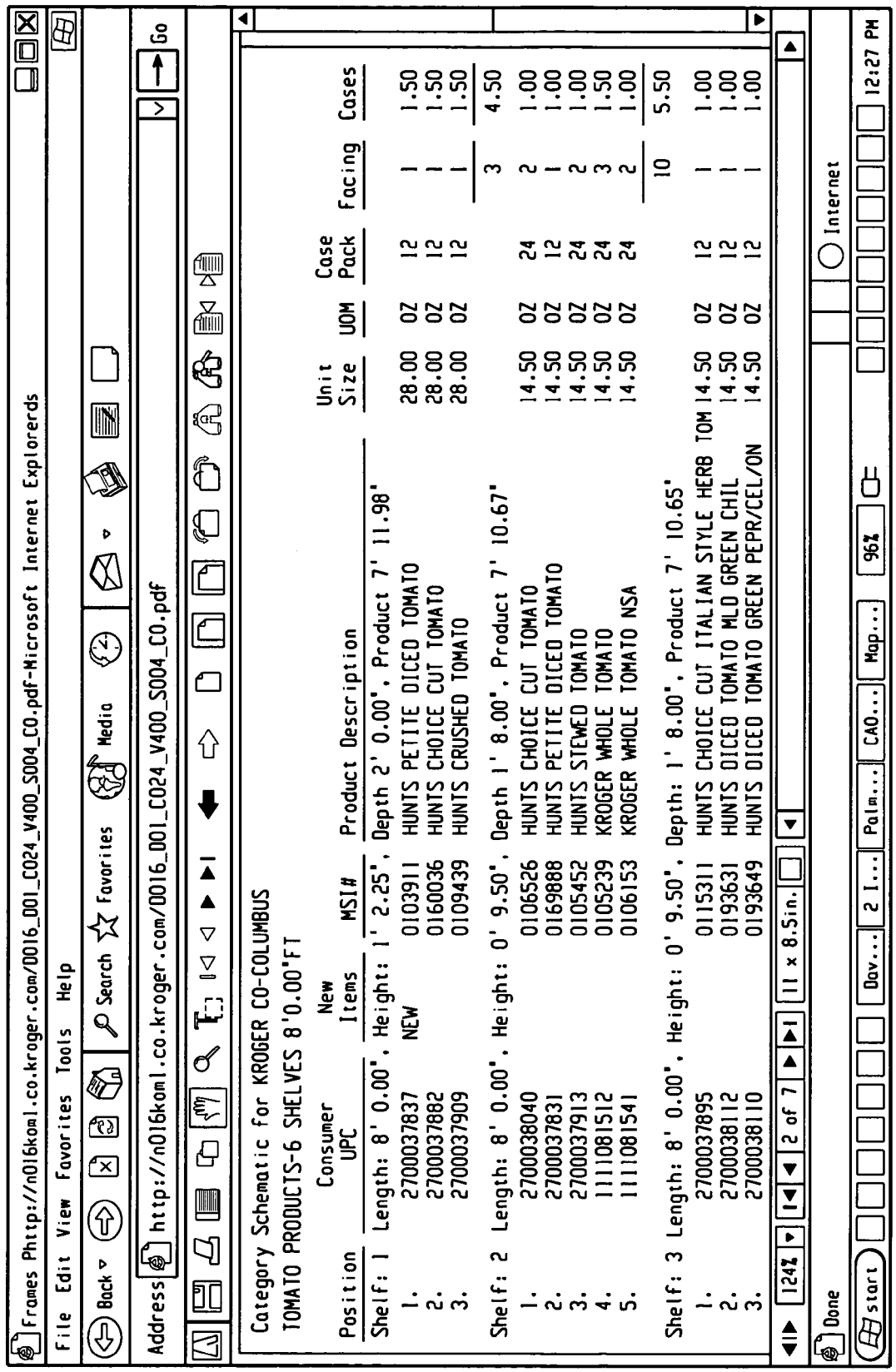
FIG. 6B is an illustration of a display screen of the planogram viewer application depicting a textual description user-selected planogram in accordance with the present invention.

FIG. 5 illustrates the planogram viewer display screen containing information identifying planograms that meet the search terms. The planogram viewer continues to display the search criteria at the top of the display screen. Preferably, the planogram view will display columns containing the division 504, department 506, commodity 508, version 510, section size 512 and date on which the planogram was last modified 514 in the search result area. All of this information may be determined from the file name and timestamp of the PDF file. The timestamp indicates the date and time on which the file was last modified. Column headings are displayed above the search results. The user may sort the list of planograms based upon the information in any of the columns by selecting the column heading. The column headings function as toggle buttons, which allow users to switch between two possible settings. Selecting the column headings can allow the user to switch between sorting the planograms in ascending or descending order. The user may perform additional searches by choosing new search terms from the menus and selecting the search button. The user may view an individual planogram by selecting the file icon 502 for the planogram from the list of planograms Referring now to FIGS. 6A and 6B, when the user elects to view a planogram, the planogram viewer opens a new window or display screen containing a graphic image of the planogram and a textual description of the contents of the planogram. The user may elect to print the image or to download the PDF file containing the planogram information to the hard drive of the workstation 22a, 22b or 22c or to some alternative storage medium attached to the workstation 22a, 22b or 22c. Such storage medium may be a disk drive, a magnetic tape or any other storage medium known in the art.

Store managers can select from the planograms contained in the enterprise level database to define the arrangement of items in their store. A store map is created for each store in the enterprise containing information identifying planograms utilized in that particular store. Store maps are saved in the division database in an additional table, identified as the store header table. The store header table contains an entry for every commodity in every department of every store. Each entry includes the POG and location information for the planogram identified by the POG. Preferably, the location information includes an aisle number, aisle orientation indicating left or right side of the aisle, and an aisle position code, indicating whether the planogram is positioned on the front, middle or back of the aisle. The key used to sort the store header table is a combination of the store number, department and commodity. This store map information can be saved to the data warehouse 26 on a regular basis, for example, on a weekly or monthly basis.

Figure 7:
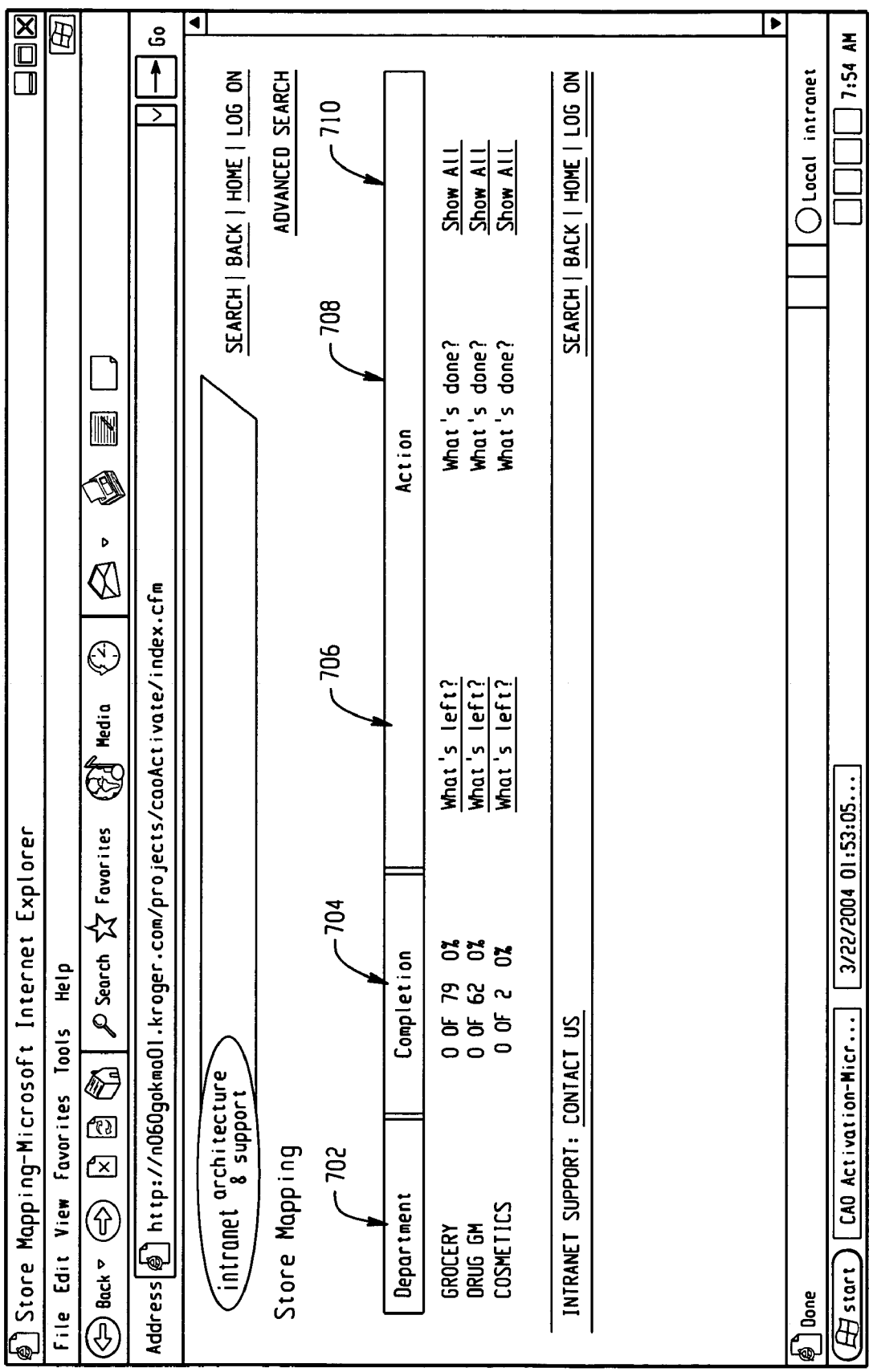
FIG. 7 is an illustration of the initial display screen of the store mapping application in accordance with the present invention.

Referring now to FIG. 7, a preferred embodiment of the present invention includes a GUI application for creating store maps. The store mapping application is located on the division application servers 20a, 20b and 20c and may be accessed from the store workstations 22a, 22b and 22c. The store mapping application displays the store departments 702 and the number and percentage of commodities that have been mapped 704 within each department. A commodity is mapped when a planogram is selected for that particular commodity. From the display screen, a store manager may elect to look at the mapped commodities 708, the commodities still to be mapped 706, or all of the commodities within a particular department 710.

Figure 8:
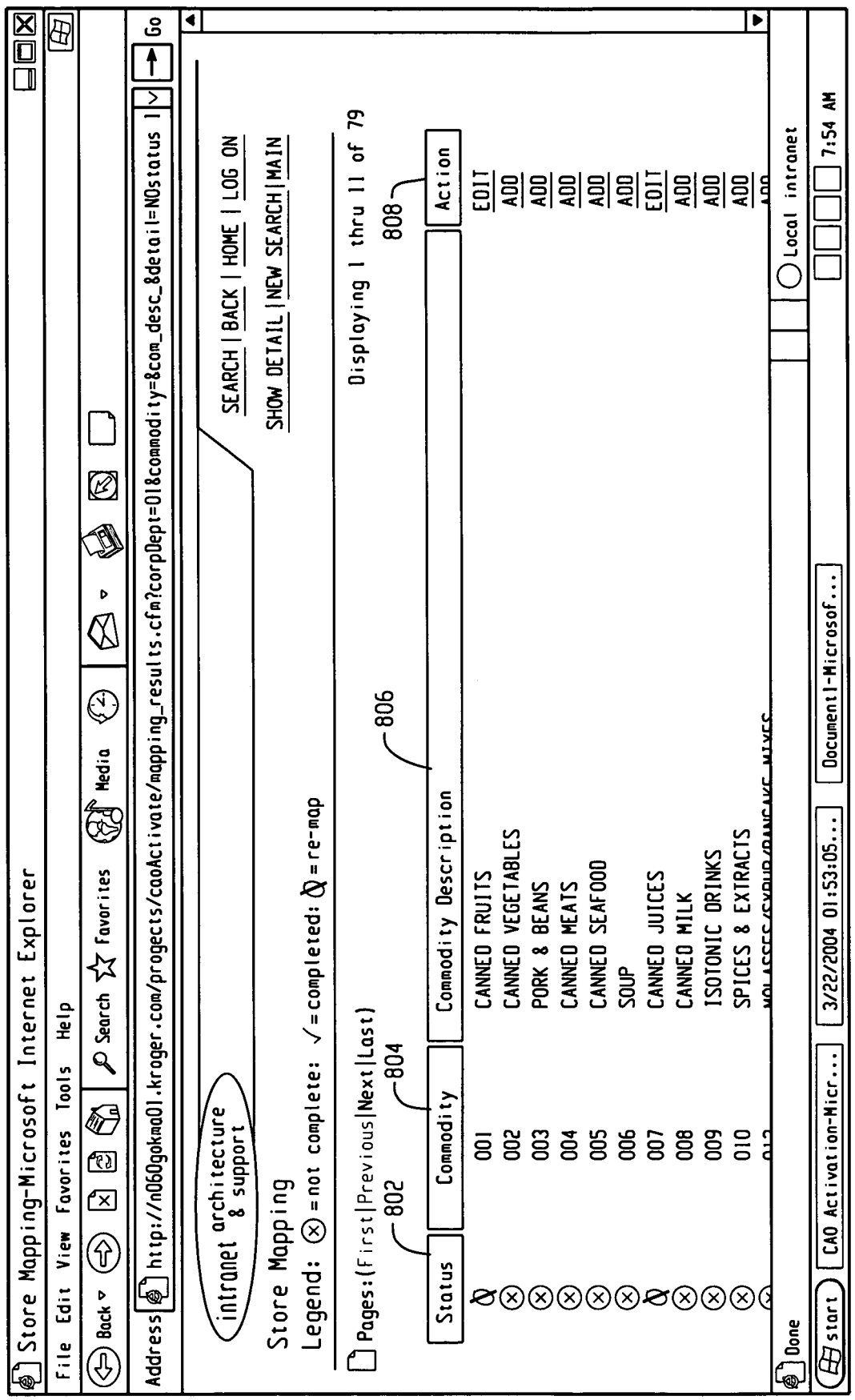
FIG. 8 is an illustration of a display screen of the store mapping application depicting the commodities for one department of a store in accordance with the present invention.

In the display screen shown in FIG. 8, the store mapping application displays a list of the commodities within the grocery department for the store. The display indicates the commodity number 804 and a description 806 for each commodity within the department. The status 802 of the commodity is indicated in the column at the far left. The status of a commodity may be complete, incomplete or remapped. Commodities that are complete have an assigned planogram. Commodities that are incomplete do not currently have an assigned planogram. Commodities are remapped when the division manager has selected a new planogram, but has left it to the discretion of the store manager whether to accept the planogram. For example, the canned fruits have a status of remapped indicating that a division manager has selected a new planogram for that commodity. The store manager may also make a final decision as to whether or when, the new planogram should be utilized. Preferably, each division manager may select planograms for the stores within their own division. Store managers may add or change planograms by selecting Add or Edit from the action column 808.

Figure 9:
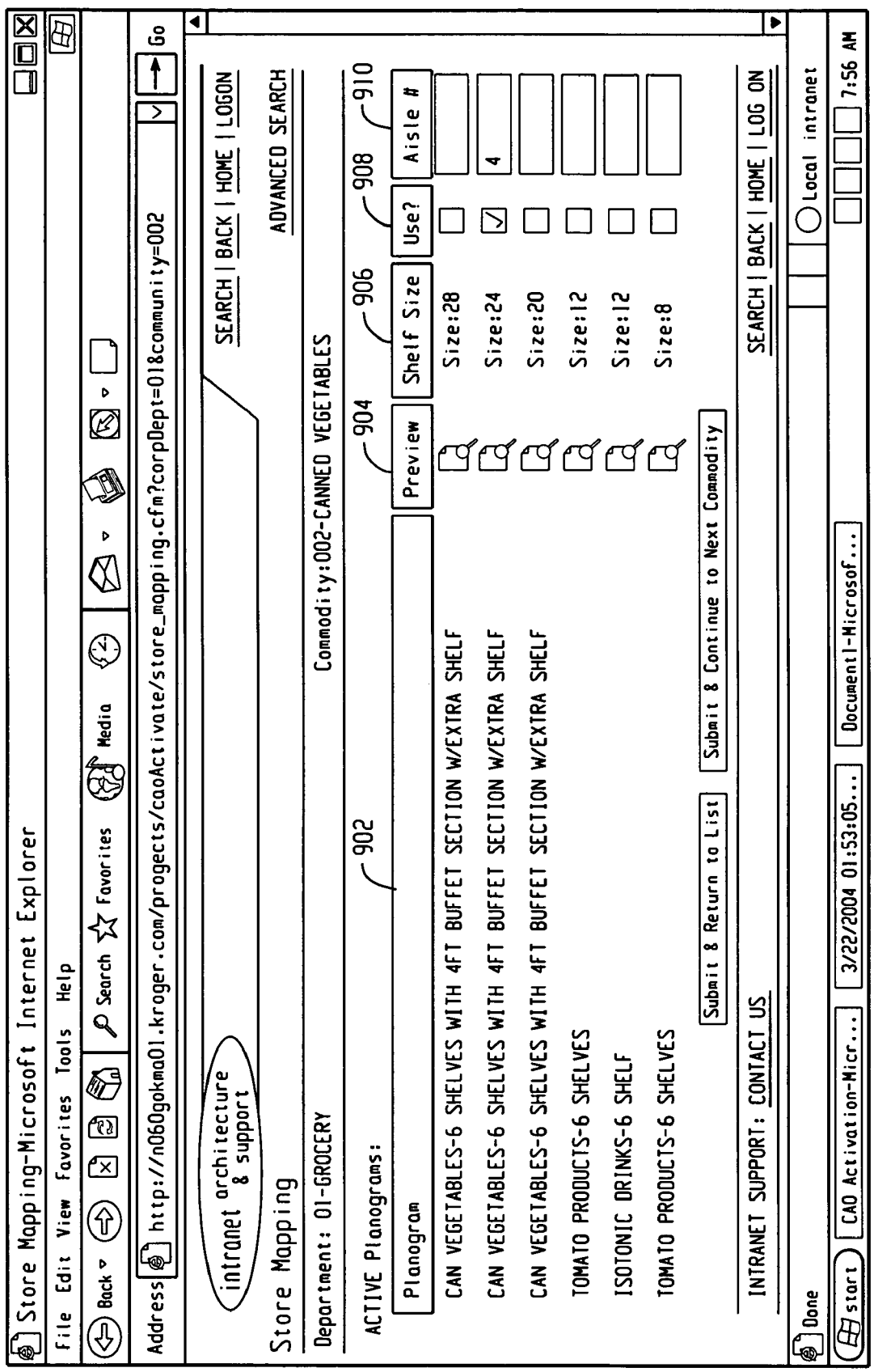
FIG. 9 is an illustration of a display screen of the store mapping application depicting the selection of a planogram in accordance with the present invention.

Referring now to FIG. 9, when the store manager elects to map a commodity, the store mapping application will display all available planograms for the commodity. Descriptions 902 and shelf size 906 of available planograms are depicted on the display screen. The store manager may elect to view any of the available planograms by selecting the icon in the preview column 904 for the planogram. Selection of the preview icon will open a new window containing a graphic image of the planogram and a textual description of the contents of the planogram, in the same manner as the planogram viewer application discussed above. The store manager may elect to map a commodity by selecting the box in the column entitled Use 908 and entering the aisle number 910 for the selected planogram. In a preferred embodiment of the store mapping application, the user may enter additional location information, such as the aisle orientation and aisle position code. The store manager may use the store mapping application to select planograms to completely define every department of the store.

Figure 10:
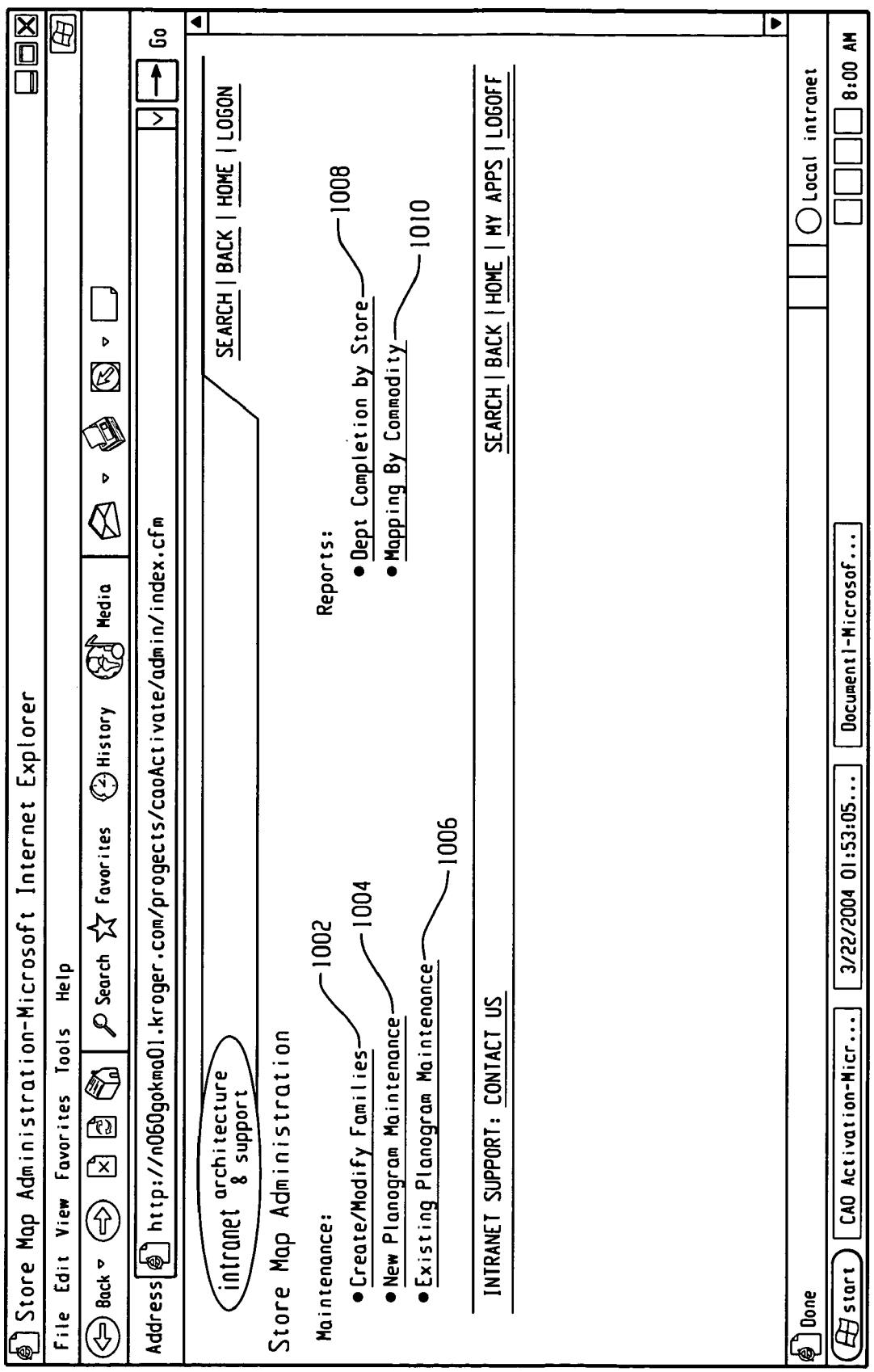
FIG. 10 is an illustration of an initial display screen of the planogram administration application in accordance with the present invention.

Referring now to FIG. 10, a GUI store map administration application is shown. The store map administration application is located on the division application servers 20a, 20b and 20c. The store map administration application is able to retrieve and modify store maps contained in the division database. In an alternative embodiment, in order to promote uniformity and consistency, store map and planogram administration may take place at the divisional level rather than the store level. While the creation and modification of the planograms stored in the enterprise level database is limited to administrators at the enterprise level, division managers are able to request new planograms or modifications to existing planograms. Division managers have the authority and ability to control the planograms used by stores within their division. Division managers may use this ability to ensure compliance with their own or the enterprise policies. For example, the enterprise may have an agreement with a supplier to sell a new item in a certain number of stores. The relevant planogram must be reset in multiple stores to include the new item. To ensure that the enterprise is meeting its obligation to sell the new item in a sufficient number of stores, a division manager may replace the existing planograms for stores within his division using the store map administration application. However, the division manager may delegate some of the store mapping decisions to store managers. This preferred embodiment of the store map administration application permits division managers to control and monitor the planograms utilized by stores within their division.

Figure 12:
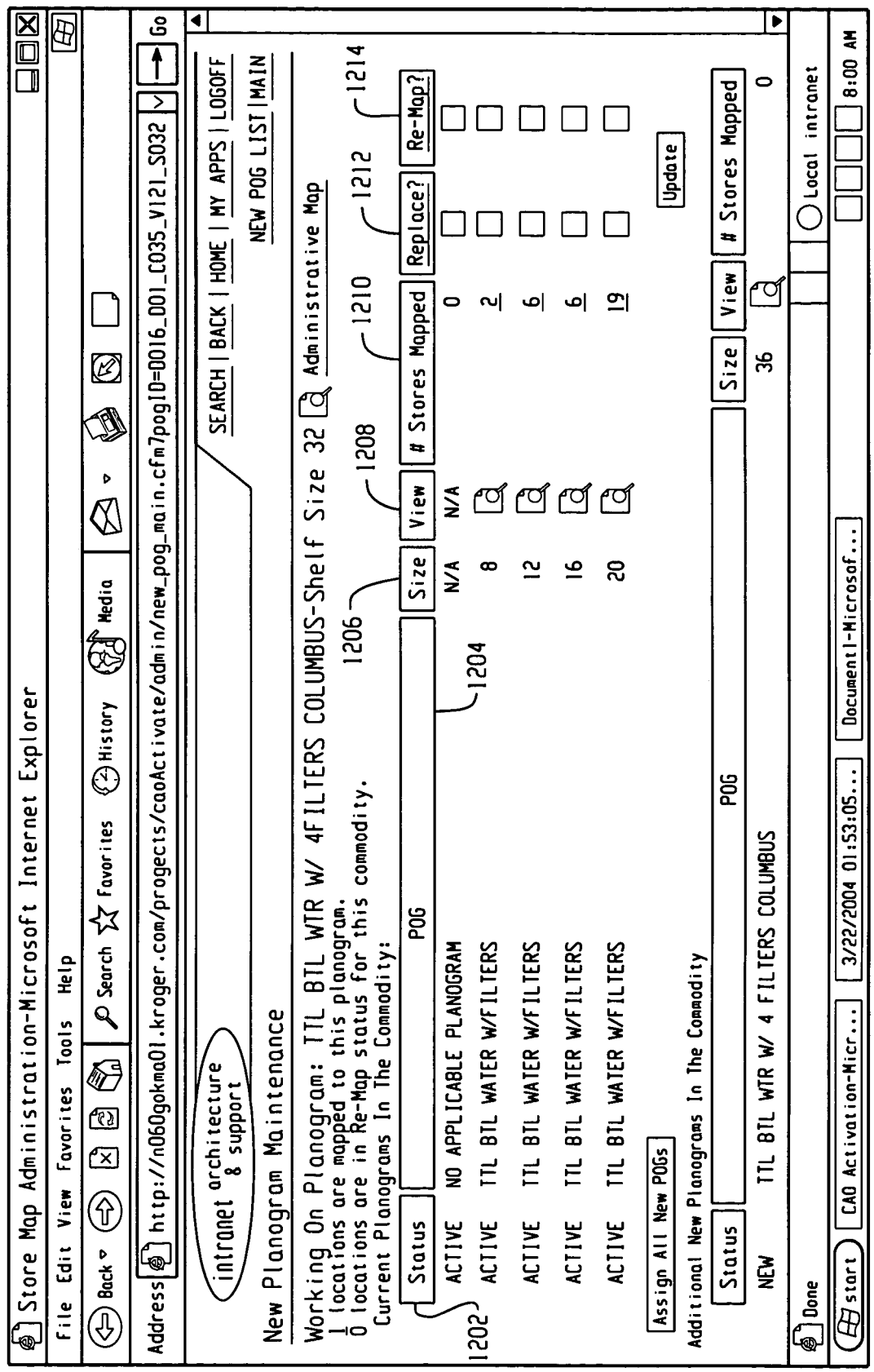
FIG. 12 is an illustration of a display screen of the planogram administration application depicting available planograms for a commodity in accordance with the present invention.

The division manager may also perform administrative functions and generate reports from the initial display screen of the store map administration application. The division manager may review new or updated planograms available from the enterprise level management by selecting New Planogram Maintenance 1004 or monitor existing planograms 1006 by selecting Existing Planogram Maintenance. The division manager should review new or modified planograms before they become available for use by the store managers. As illustrated in FIG. 11, the store map administration application displays the new planograms generated at the enterprise level and ready for dissemination to the stores. As shown in the display screen depicted in FIG. 12, by selecting one of the new planograms, the store manager is able to view all available planograms for that commodity. The display screen can indicate the status 1202 of each planogram, the POG 1204, the section size 1206, and the number of stores currently utilizing the planogram 1210. The GUI allows the division manager to replace one or more of the current planograms with the new planogram 1212, in which case the new planogram is automatically utilized by the stores. Alternatively, the division manager may elect to remap the planogram 1214, permitting the store manager to make the final decision as to which planogram to utilize. The division manager may view the planogram in detail by selecting View 1208.

The store map administration application also allows division managers to create families, which relate planograms to multiple commodities by selecting Create/Modify Families 1002 on the display screen. For example, if you have two commodities, such as coffees and coffee creamers, a coffee planogram for a small section may contain both coffee and coffee creamer items. In this instance the division manager can create a family that relates the small coffee planogram to the coffee creamer commodity. As a result, if a store maps either the coffee or the coffee creamer commodity, the small coffee planogram will appear in both of those planograms. If this small coffee planogram is selected for either commodity, the status of both the coffee and the coffee creamer commodity will be changed to complete.

Figure 13A:
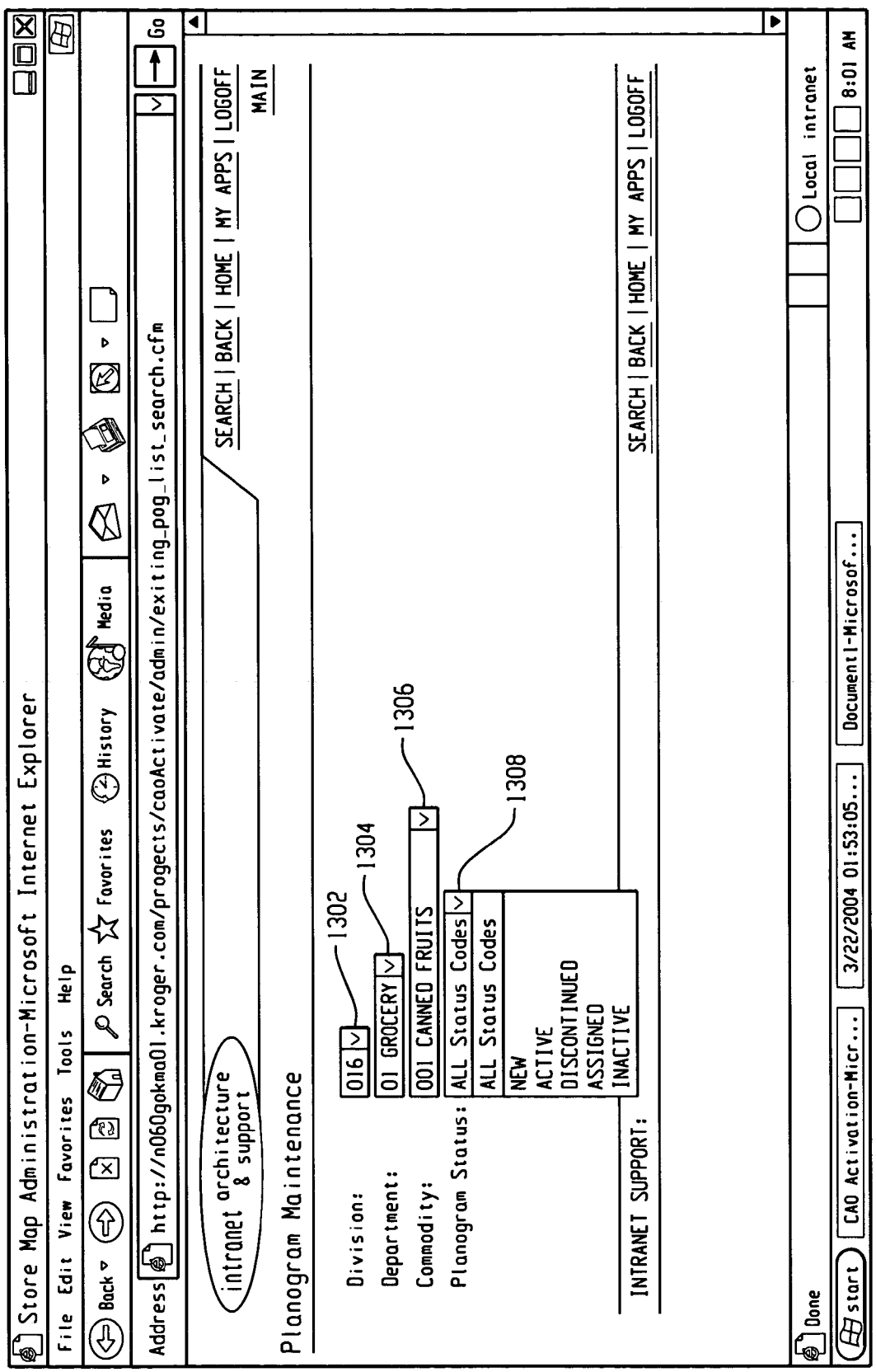
FIG. 13A is an illustration of a display screen of the planogram administration application depicting a search screen in accordance with the present invention.
Figure 13B:
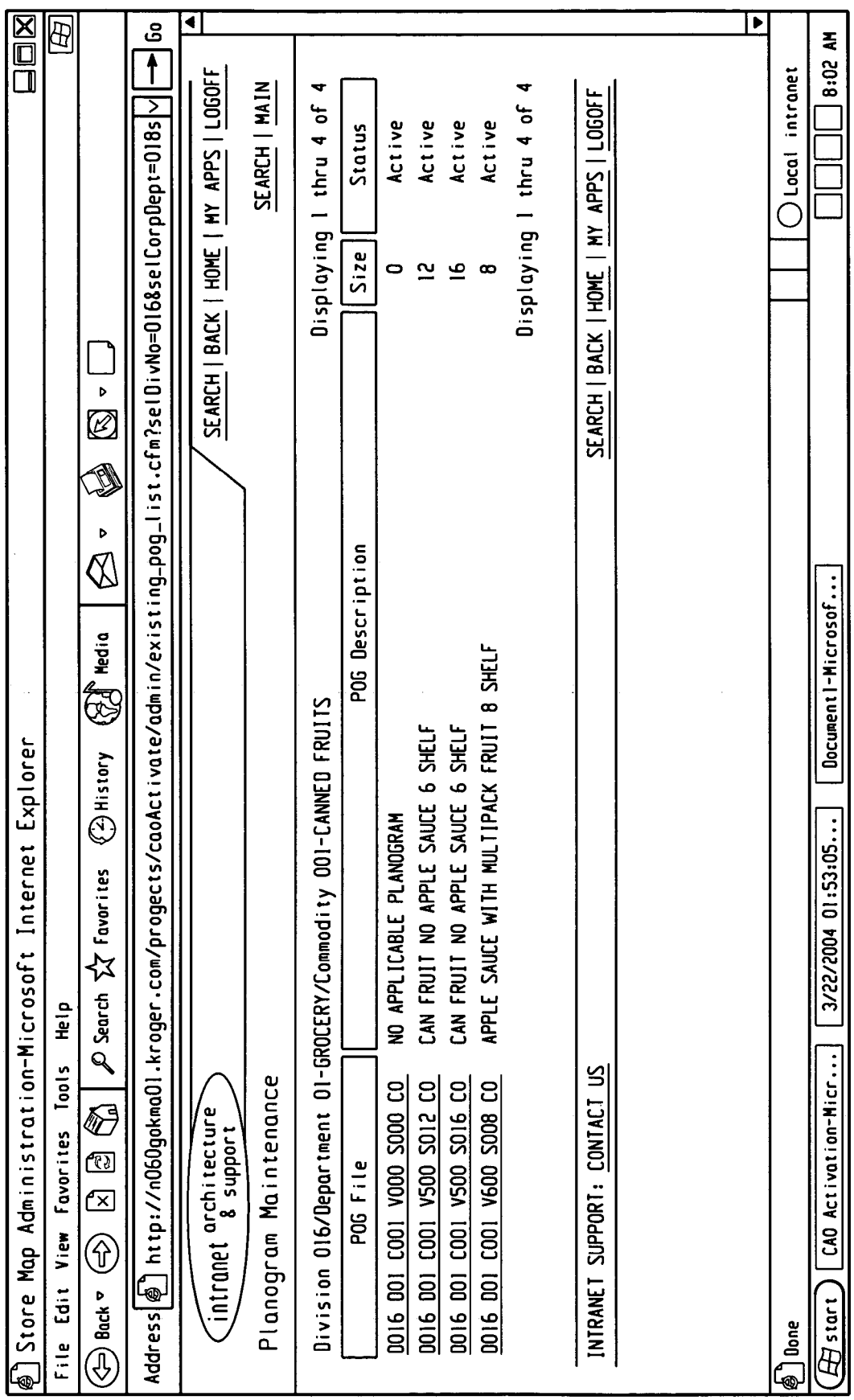
FIG. 13B is an illustration of a display screen of the planogram administration application displaying search results in accordance with the present invention.

Referring now to FIGS. 13A and 13B, the store map administration application provides the division manager with the ability to search the store maps based upon division 1302, department 1304, commodity 1306 and planogram status 1308. Planogram status, as used herein, indicates whether the planogram is new, assigned, active, inactive or discontinued. New planograms are visible to division managers, but may not have been approved by the division managers for use. Consequently, new planograms are not yet available to the store managers. Assigned planograms are those that have been approved by division managers and are available to store managers, but are currently not in use. Active planograms are those that have been assigned and are currently in use. An inactive planogram is a planogram that has been removed from the enterprise level database, but is still in use by certain stores for various reasons. A discontinued planogram is an inactive planogram that is no longer in use in any stores. FIG. 13A illustrates the search display screen of the store map administration application, while FIG. 13B illustrates the results of the search. The ability to search the store maps provides the division managers with a simple method for monitoring store compliance. For example, the division manager may search for inactive planograms to determine which stores have not updated their planograms. The division manager may also use the store map administration application to replace the inactive planogram.

Referring now to FIGS. 14A and 14B, the store map administration application may also be used to generate reports and monitor stores within the division. The division manager may elect to generate reports based upon department completion by store 1008 or mapping by commodity 1010. The division manager may search the store maps by division 1402 and department 1404 to review the status of the stores and to monitor whether they are completely mapped. FIG. 14B illustrates the results of the search, a report listing all of the stores in the division indicating the number and percentage of commodities completed by each store. In this embodiment the division manager may select one or more of the stores to view in detail.

Once a store map has been created, the store map may be used in conjunction with an inventory system. Preferably, the inventory system is a software program at the store level connected to the workstation 22a, 22b or 22c. Periodically, a Perl script located on the division database server 18a, 18b or 18c generates a text file containing item information for the store. This text file is transmitted to the workstation 22a, 22b or 22c and is imported into the inventory system. The text file contains information regarding each of the items to be stocked in the store, including a recommended minimum stock level for each item.

The inventory system tracks the actual stock levels of items in the store. For example, Inventory Pro 4.5, commercially available from M & R Technologies, Inc. of Palm Bay, Fla. In a preferred embodiment, handheld bar code scanners record each unit of each item as it is received at the store. Scanners are devices for sensing and reading bar codes identifying the items. One such scanner is the Econoscan™ commercially available from ID TECH® of Fullerton, Calif. A point of sale system (POS) record units of items sold. One possible POS is the BEETLE®/OnePOS, commercially available from Wincor Nixdorf, Inc. of Austin, Tex. Scanners may also be used to track units of items recorded as a loss due to shrinkage. As the items are discarded they are recorded using a scanner. The inventory system uses the data received from scanners and POS system to track the stock levels of items in the store.

The inventory system generates a list of items that need to be replenished, by comparing the actual stock levels to the minimum recommended stock level of each item. The store map may be used in conjunction with the inventory system to generate orders automatically when stock levels fall below predetermined minimum levels. In a preferred embodiment, the orders may be sent automatically to the warehouse. The inventory system may use the file transfer protocol (FTP) to transmit a file containing order information to the warehouse. Preferably, the inventory system receives information from the store maps on a regular basis, such as daily or weekly.

In another embodiment, the store map administration application provides a method for scheduling of store section reset events. As discussed above, during a store section reset all items are removed from a section of the store, the shelves in the section may be reconfigured and the items are returned to the section in a new arrangement. To schedule an event, the division manager must enter the date of the store section reset, the commodities to be reset, the planograms to be used and the store numbers of the affected stores. This information is saved in an event table in the division database. Periodically, a Perl script retrieves the information from the event table. Using the information in the event table, the script is able to retrieve information regarding the new planograms to be used in the affected stores. The script generates a text file for each store with the new item information. The text file is transmitted to the store workstation 22a, 22b or 22c and read by the store inventory system. The inventory system at the store is able to order items prior to the store section reset using the text file.

The division manager is able to monitor compliance with the requested store section resets. The store map application will prompt store managers to validate the new planograms when sections of the store are reset. Division managers are able to monitor the validation of planograms using the store administration application and measure compliance with the rollout of new planograms from the enterprise level administration.

In an alternative embodiment, information from the inventory system may be imported into the store map application. The store map application may receive information from the inventory system regarding current stock levels of the items. In this embodiment the division database server 18a, 18b or 18c would include a store inventory table containing inventory information received from the inventory system and updated, preferably, on a daily basis. The store inventory table would contain an entry for every item in each store, including information indicating whether the store carries the item, the balance of units on hand for the item and the last day a unit of that item was sold. The key used to sort the store inventory table would be the store number and the UPC of the item.

In yet another embodiment of the present invention, a store map may be utilized in a system for displaying item location to consumers from a Kiosk in the store. The store map and other database tables described herein may be used to supply item information and item location for all items within the store to a system for providing item location to consumers. Additionally, the PDF files may be utilized to show consumers a picture of the item on the store shelf.

While particular embodiments of the present invention have been illustrated and described, it would be obvious to those skilled in the art that various additional changes and modifications can be made without departing from the spirit and scope of the present invention. While these planograms, maps, stores and commodities have been shown illustrative of a grocery store certainly those of skill in the art can apply these principles to factories and warehouses of various types. For example, a commodity could be a type of automotive component such as wheels, tires, doors, mufflers, and the like. It is therefore intended to cover in the appended claims all such changes and modifications that are within the scope of this invention.

What is claimed:

1. A method for arranging a collection of electronic planogram files, wherein said collection of electronic files is illustrative of the arrangements of items on portions of store shelves, said method comprising the steps of:
   a) providing a plurality of the electronic planogram files including a first set of electronic files and a second set of electronic files, the first set of electronic files containing a graphical depiction and a textual description of an arrangement of a plurality of items on at least a portion of a store shelf, the second set of electronic files containing only text characters and identifying a minimum number of stock units for each of the plurality of items;
   b) storing the first set of electronic files in a storage medium on an enterprise level system and transmitting the second set of electronic files to a division level system;
   c) creating a collection file for storage of identification information for at least one of the first and second sets of electronic files;

d) obtaining identification information for at least one electronic file from the storage medium on the enterprise level system or the storage medium on the division level system;
e) storing said identification information for at least one of the obtained electronic files in the collection file; and
f) providing an inventory system comprising a scanner, and importing into the inventory system from the second set of electronic files the minimum number of stock units for each of the plurality of items, wherein the inventory system:
   obtains an actual number of units for each of the plurality of items;
   compares the actual number of units to the minimum number of stock units for each of the plurality of items; and
   generates a stock order for the order amount when the actual number of units is less than the minimum number of stock units for at least one of the plurality of items.

2. A store mapping system for enabling commodities to be mapped to locations within a store of a given division of an enterprise, comprising:
   a) an enterprise level system containing a collection of planogram information files for multiple divisions of the enterprise;
   b) a division system of the given division, the division system containing a compilation of planogram information files associated with the given division and connected to the enterprise level system through a network, the division system further including a store mapping application; and
   c) at least one workstation connected to the division system and the enterprise level system through a network such that the store mapping application can be used to map commodities within the given store, wherein a user accesses the store mapping application from the workstation and:
      (i) the user is presented with multiple commodities that can be mapped for the given store,
      (ii) upon user selection of a given commodity for mapping, the user is presented with multiple available planograms for the given commodity, each planogram identified by description and having a user view selection enabling the user to view the planogram and a user use selection enabling the user to select the planogram for use in mapping the given commodity within the given store,
      (iii) upon user selection of a given planogram for the given commodity, the user identifies aisle information for the commodity to facilitate mapping,
   wherein the compilation of planogram information files are used to define a store map that contains information sufficient to identify the planograms selected for use in the given store.

3. The store mapping system of claim 2, wherein the enterprise level system comprises an enterprise level application server and an enterprise level database server connected through a network, the enterprise level database server containing the collection of planogram information files.

4. The store mapping system of claim 3, wherein the division system comprises a division database server and a division application server, wherein the compilation of planogram information files is located in the division database server.

5. The store mapping system of claim 4, wherein the compilation of planogram information files contained on the division system is contained in a relational database.

6. A store mapping system for enabling commodities to be mapped to locations within a store of a given division of an enterprise, comprising:
   a) an enterprise level system containing a collection of planogram information files for multiple divisions of the enterprise;
   b) a division system of the given division, the division system containing a compilation of planogram information files associated with the given division and connected to the enterprise level system through a network; and
   c) a store mapping application residing on one of the division system and the enterprise level system;
   d) at least one workstation connected to the division system and the enterprise level system through a network such that the store mapping application can be used to map commodities within the given store, wherein the store mapping application implements a store mapping method at the workstation in which:
      (i) a user is presented with multiple commodities that can be mapped for the given store,
      (ii) upon user selection of a given commodity for mapping, the user is presented with multiple available planograms for the given commodity, each planogram can be viewed by the user for consideration and selected for use in mapping the given commodity within the given store,
      (iii) upon user selection of a given planogram for the given commodity, the user identifies aisle information for the commodity to facilitate mapping,
   wherein the compilation of planogram information files are used to define a store map for the given store that contains information sufficient to identify the planograms selected for use in the given store and the location of each of such planograms within the given store based at least in part upon the aisle information identified by the user.

* * * * *